United States Patent [19]

Maier

[11] 4,432,019

[45] Feb. 14, 1984

[54] SIMULTANEOUS AMPLITUDE SEQUENCY APPARATUS

[76] Inventor: James J. Maier, 37 Kellogg St., Clinton, N.Y. 13323

[21] Appl. No.: 357,443

[22] Filed: Mar. 12, 1982

[51] Int. Cl.³ .............................................. H04N 1/41
[52] U.S. Cl. .................................... 358/260; 364/726
[58] Field of Search ...................... 364/576, 726, 827; 358/133, 138, 260, 280; 375/1, 122; 381/31, 32

[56] References Cited

U.S. PATENT DOCUMENTS

| | | | |
|---|---|---|---|
| 4,164,788 | 8/1979 | Jain | 364/576 |
| 4,179,709 | 12/1979 | Workman | 358/138 |
| 4,293,920 | 10/1981 | Merola | 364/725 |
| 4,398,217 | 8/1983 | Peters | 358/138 |

*Primary Examiner*—Benedict V. Safourek
*Attorney, Agent, or Firm*—Donald J. Singer; William Stepanishen

[57] ABSTRACT

A simultaneous amplitude sequency apparatus utilizing a scanner/modulator unit to scan an image and provide an analog data signal, which is digitized in an A/D converter. The digital data signal is transformed by a Fourier transform unit into a frequency signal. A digital filter which allows only the high frequency terms to pass, preserves the sharp edges of the image that are required in the analysis of the imagery. The correlation portion of the system insures that the applicable amplitude data points are synchronized with the corresponding points in the sequency signal. Thus, compression of the imagery signal is achieved while insuring that the important information is preserved (i.e., sharp amplitude time varying changes). The high order of imagery compression which is in the range of 20/1 insures that the important data is preserved.

6 Claims, 3 Drawing Figures

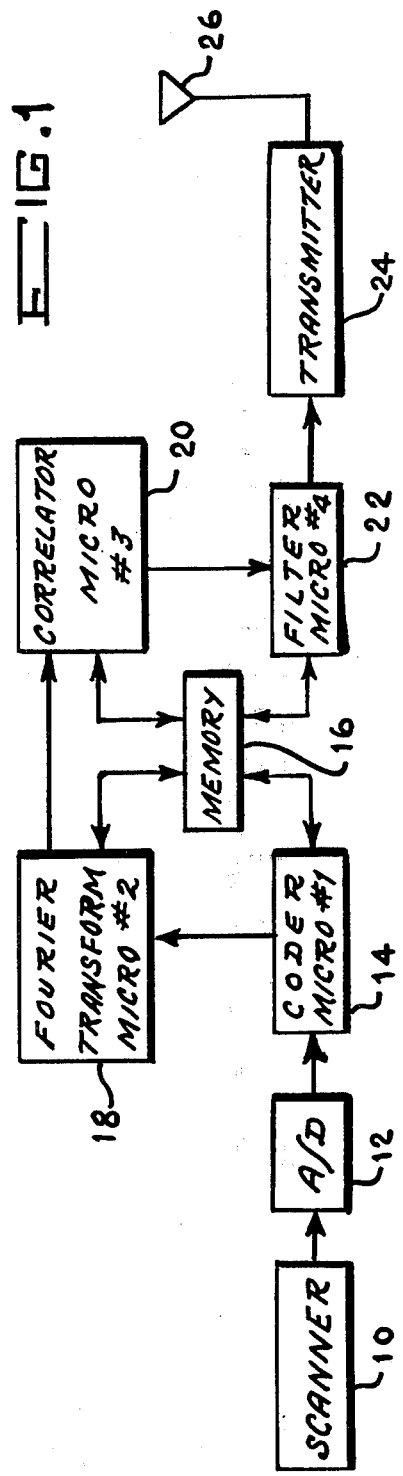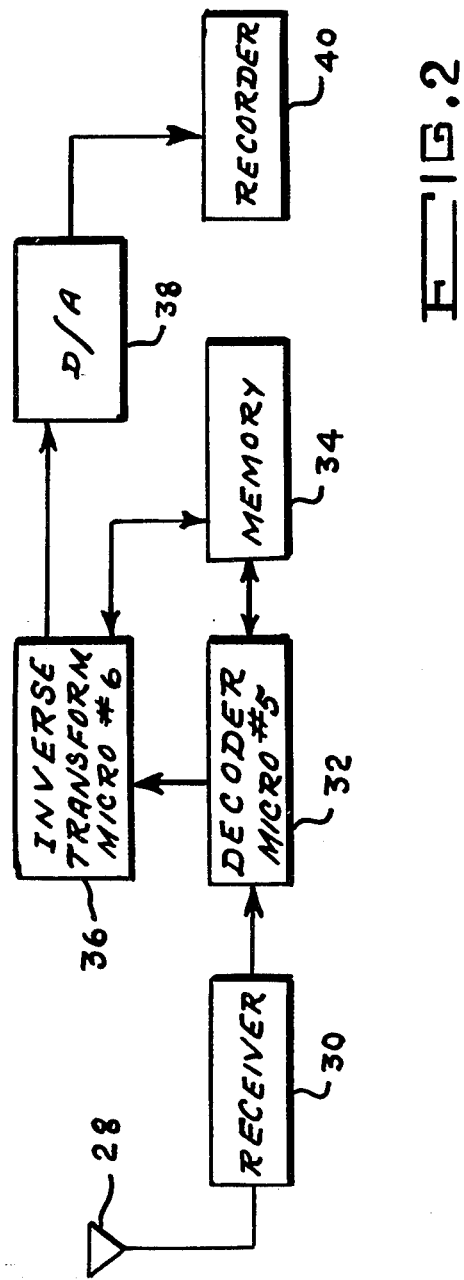

SIMULTANEOUS AMPLITUDE SEQUENCY APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to an imagery compression system, and in particular to a simultaneous amplitude sequency system.

A wide variety of data compression systems are known to the art. Usually, data compression is effective only in cases where a redundant digital code is employed, or where the data is redundant in nature by its very content. As an example of the latter situation is in digital video, facsimile or other graphic systems wherein data bits relate to graphical presentations of some sort. Such systems may include weather map transceivers, picture phone, medical display, navigational displays and digital sonar and radar presentation systems, including scan converters. One well known form of data compression system is a coarse/fine system wherein during periods in which the video intensity is changing very slowly, only fine changes are transmitted, and where it is changing rapidly, only coarse changes are transmitted. However, such systems are rather complex and require considerable hardware or significant utilization of a special purpose computer to be mechanized. On the other hand, a form of data compression known as delta modulation, which simply changes the video level by one gray level at a time from one picture resolution element to the next, has been utilized. However, areas of high spatial frequency content (rapid changes in video level) are distorted because of the limited system slow rate.

In any data compression system, it is essential that the additional hardware which is required to compress the data must be much less bulky and costly than the hardware that it allows to be removed in order for the overall system cost and complexity to be reduced by means of data compression. Further, the data compression should not sacrifice necessary performance or video quality.

SUMMARY OF THE INVENTION

The present invention utilizes a scanner/modulator unit to generate a wideband video signal which is converted to digital data and stored in a memory unit. The digital data is also transformed into frequency terms by a Fourier transform unit. Time samples of the digital data are correlated with frequency samples data and only samples which meet the correlation criteria are passed through a bandpass digital filter. The correlated samples may be transmitted by either a radio frequency or a hardware media. A receiver group which comprises a decoder, an inverse Fourier transform unit, a D/A converter and a recorder are utilized to decode and transform the correlated frequency samples into imagery data that may be recorded.

It is one object of the present invention, therefore, to provide an improved simultaneous amplitude sequency apparatus.

It is another object of the invention to provide an improved simultaneous amplitude sequency apparatus for reducing wide bandwidth imagery data for compression signal transmission.

It is a further object of the invention to provide an improved simultaneous amplitude sequency apparatus that utilzes a combination of frequency time imagery signal compression to reduce transmission signal bandwidth.

It is yet another object of the invention to provide an improved simultaneous amplitude sequency apparatus that simultaneously correlates amplitude information samples with Fourier transform information samples to provide imagery signal compression.

These and other advantages, objects and features of the invention will become more apparent after considering the following description when taken in conjunction with the illustrative embodiment in the accompanying drawings.

BRIEF DESCRIPTION OF THE DRAWINGS

FIG. 1 is a block diagram of the transmitter group of the simultaneous amplitude sequency apparatus, FIG. 2 is a block diagram of the receiver group of the simultaneous amplitude sequency apparatus, and, FIGS. 3a and 3b are graphical representations respectively of time and sequency samples in the present apparatus.

DESCRIPTION OF THE PREFERRED EMBODIMENT

Figure 3A:
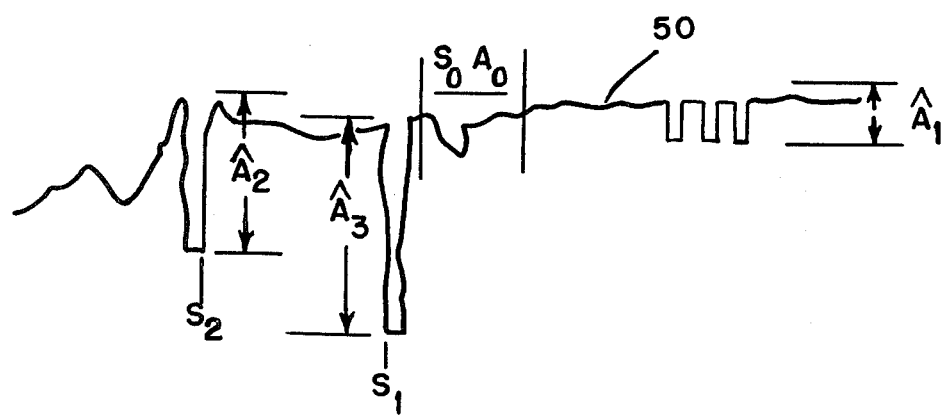

Referring now to FIG. 1, there is shown a simultaneous amplitude sequency system that is a combination time frequency imagery compression system. The scanner unit 10 is utilized to scan a scene and to generate an analog signal proportional thereto. The scanner unit 10 may comprise a transducer type scanner which is shown and described in the reference article entitled, "An Analysis of Digital and Analog Instrumentation Systems and Components", written by C. G. Enke and published in "Microcomputers, Hardware, Software and Appliations". IEEE Press, 1972. The output from the scanner unit 10 is applied to the A/D converter unit 12 wherein the analog signal is converted to a digital signal. The A/D converter unit 12 may be the same type of apparatus that is shown and described in the reference publication entitled, "A Users Handbook of D/A and A/D Converters", written by Eugene R. Hantek and published by Wiley Interscience Publication, copyrighted 1976.

The digital signal from the A/D converter unit 12 is applied to the coder unit 14 where it is coded and sent to the memory unit 16 for storage and to the Fourier transform unit 18 for transformation into frequency terms. Both the coder unit 14 and the Fourier transform unit 18 may be microprocessor units which are respectively programmed to perform their stated functions. The frequency signal from the Fourier transform unit 18 is applied to the correlator unit 20 which also receives the digital signal from the memory unit 16. The correlator unit 20 correlates the frequency signal with the digital signal and sends the correlated sequency signal to the filter unit 22 for bandpass filtering. The filtered sequency signal from the filter unit 22 is applied to the transmitter unit 24 for transmission from antenna 26. The transmitter unit 24 may be any suitable transmitter medium such as an FM transmitter.

Turning now to FIG. 2, there is shown the receiver group of the simultaneous amplitude sequency apparatus. The frequency signal from the transmitter group is received at antenna 28 and applied to receiver unit 30.

The receiver unit 30 may be any suitable conventional receiver unit such as an FM receiver. The frequency signal from the receiver unit 30 is applied to the decoder unit 32 where the signal is decoded. The decoded sequency signal is then sent to the memory unit 34 and the inverse Fourier transform unit 36. Both the decoder unit 32 and the Fourier inverse transform unit 36 are programable microprocessor units which are programmed to perform the stated function. The output signal from the inverse transform unit 36 is a digital signal which is applied to D/A converter unit 38. In the D/A converter unit 38, the digital signal is converted to an analog signal which is sent to the recorder unit 40 to be recorded.

Figure 3B:
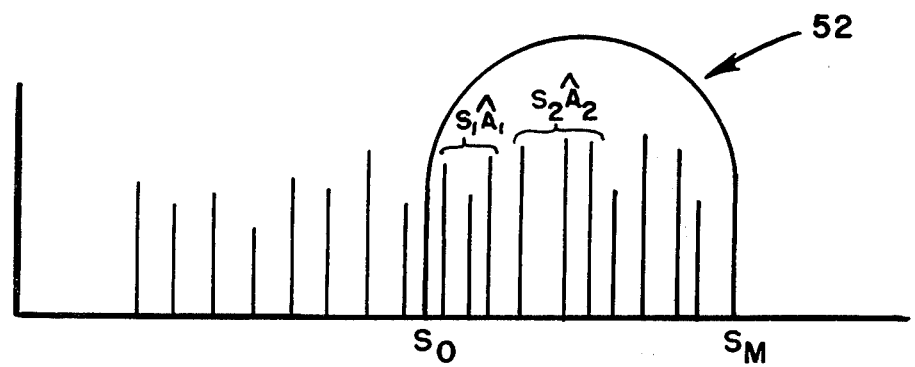

There is shown in FIG. 3a a graphical representation of a typical analog signal 50 of the type that would be generated by the scanner unit 10 of FIG. 1 and in FIG. 3b there is shown the equivalent sequency signal 52 that would be generated by the Fourier transform unit 18 of FIG. 1. The amplitude of the analog signal 50 is sampled at a number of points and is correlated with the corresponding point in the frequency signal 52 to determine whether this position of the signal meets the system's bandpass requirements. Thus, it may be seen that the simultaneous amplitude sequency apparatus utilizes the voltage variations of a signal as well as the frequency response of the signal in order that both portions are used to filter out and pass only that portion of the frequency waveform which meets the a priority established criteria. The established criteria conditions are given in the following table:

TABLE I

| Criteria conditions | |
|---|---|
| $S_1\hat{A}_o$ | Reject |
| $S_2\hat{A}_1$ | Reject |
| $S_1\hat{A}_1$ | Reject |
| $S_o\hat{A}_o$ | Reject |
| $S_o\hat{A}_1$ | Reject |
| $S_m(<\hat{A}_1), (<S_o)$ | Reject |
| $S_1\hat{A}_3$ | Pass |
| $S_2\hat{A}_2$ | Pass |
| $S_m(>\hat{A}_1), (>S_o)$ | Pass |
| $(>S_o), (>\hat{A}_1)$ | Pass |

If a digital sample is not within a specified voltage in the time domain, and also is not within a specified bandpass, then that sample is disallowed to pass through the system, and the net result is a reduced or a compressed waveform or data. The central principle of the present invention is that the sample must simultaneously be passed by the voltage tolerance and the bandpass tolerance. Thus, the simultaneous amplitude sequency apparatus will allow for the enhancement of sharp, abrupt changes in the signal which encompasses the fine edges of imagery that usually provides the most information.

The following is a further explanation of the data flow in transmitting and receiving groups of the simultaneous amplitude sequency apparatus in which imagery data has been compressed, transmitted, received, and reassembled. The simultaneous amplitude sequency apparatus utilizes an adaptive compression technique which codes the time samples that are digitized by the analog to digital converter unit. After coding by the coder unit which is a programmable microprocessor, the samples are sent to the second microprocessor which is programmed to perform a Fourier transformation on the coded data samples. The data from the memory unit and the Fourier transform unit are sent to the correlator unit which is a programable microprocessor that is programed to perform correlations between the received data. The time samples are correlated with the transform samples in the correlator unit. Only those samples which meet the earlier specified criteria are allowed to pass through the digital filter which is the bandpass filter for ony those samples which meet the criteria, i.e., are within the voltage tolerance limits, and the frequency bandpass tolerance limitations. The digital filter unit is also a programable microprocessor unit that has been programed to filter the applied data. The correlated samples are an output of the digital filter with the response of $H(u,v)$, and are the samples being allowed to pass from $S(u_m v_m)$ to $S(u_n v_n)$. After processing, the data is transmitted via a standard transmission mode either through a radio frequency (RF) or hardwire media.

At the receiver group, the data is decoded and an inverse transform is performed to again process the data into an analog signal. After processing, the only data which is left are the samples which have been allowed to pass through the digital filter at the transmitter portion of the system. Thus, there will be gaps in the data for those samples which have not passed. When the time signal is again recorded, the gaps which are a result of those samples that have not passed will be filled in by the inverse transform unit (micro-processor #6) and the accompanying memory. The net result will be a signal which has been compressed in time by disallowing some of the samples to pass through the system. The output signal will only contain that information which: a. is within the voltage threshold of the time signal, and b. is simultaneously within the bandpass of the frequency limits.

In the present apparatus it should be noted that many of the components of the present invention are standard conventional devices. For example, the analog and digital (A/D) and digital/analog (D/A) converter units are standard functional blocks which are described in "A Users Handbook of D/A and A/D Converters" by Eugene R. Hnatek, Wiley Interscience Publication, Copyright 1976. The microprocessor units which are utilized to perform the various coding, transformation and correlation functions are described on pg 40-20 under "Reference Data for Radio Engineers", Howard Sams and Co., 1977. The coder function and the digital filter are described in "An Analysis of Digital and Analog Instrumentation Systems and Components" by C. G. Enke, reference pages 72 through 85 and pages 355 and 356. The memory units are standard random access memory as described in "Integrated Electronics", Millman, Halkios, McGraw Hill, 1972 on page 658, in FIG. 17-55. The transform processing is described in "Image Processing by Digital Computer" by Harry Andrews, A. G. Tescher, and Richard Kruger, from the IEEE Spectrum, July 1972.

Although the invention has been described with reference to a particular embodiment, it will be understood to those skilled in the art that the invention is capable of a variety of alternative embodiments within the spirit and scope of the appended claims.

What is claimed is:

1. A simultaneous amplitude sequency apparatus comprising in combination:
   A transmitter group which comprises:
      a scanner means to scan a scene and generate an image signal thereof, an A/D converter means to convert said image signal to a digital signal, a coder means to receive said digital signal, said coder means coding said digital signal to provide a coded digital signal, a first memory means to receive and store said coded digital signal, a Fourier transform means to receive said coded digital signal, said Fourier transform means transforming said coded digital signal into a frequency signal, said frequency signal being applied to said first memory means for storage, a correlator means to receive said frequency signal from said Fourier transform means and to receive said coded digital signal from said first memory means, said correlator means correlating said frequency signal with said coded digital signal, said correlator means generating a correlated samples signal from the portions of the frequency signal which meet the correlation criteria, a filter means to receive said correlated samples signel from said correlator means, said filter means only passing those correlated samples of said correlated samples signal which meet the frequency bandpass tolerance limitations of said filter means, and, a transmitter means to receive said correlated samples signal from said filter means, said transmitter means including an antenna from which said correlated samples signal is transmitted, and, A receiver group which comprises:

a receiver means with an antenna to receive and correlate samples signal, said receiver means detecting said correlated samples signals, a decoder means to receive said correlated samples signal from said receiver means, said decoder means decoding said correlated samples signal into a frequency signal, a second memory means receiving said frequency signal from said decoder means, said second memory means storing said frequency signal, an inverse Fourier transform means to receive said frequency signal from said decoder means, said inverse Fourier transform means transforming said frequency signal into a digital signal in which any gaps that may occur in the frequency signal due to filtering in said receiver group prior to transmission, will be filled by said second memory means, a D/A converter means to receive said digital signal from said inverse Fourier transform means, said D/A converter means converting said digital signal to an analog image signal, and, a recorder means to record said analog image signal which is received from said D/A converter means.

2. A simultaneous amplitude sequency apparatus as described in claim 1 wherein said coder means and said decoder means respectively are programable microprocessors which are programed to perform the code and decode function respectively.

3. A simultaneous amplitude sequency apparatus as described in claim 1 wherein said Fourier transform means and said inverse Fourier transform means respectively are programable microprocessors which are respectively programed to perform the Fourier transform and the inverse Fourier transform respectively.

4. A simultaneous amplitude sequency apparatus as described in claim 1 wherein said first memory means and said second memory means respectively comprise a random access memory.

5. A simultaneous amplitude sequency apparatus as described in claim 1 wherein said correlator means comprises a programable microprocessor which is programed to perform the correlation function.

6. A simultaneous amplitude sequency apparatus as described in claim 1 wherein said filter means comprises a programable microprocessor which is programed to perform the bandpass filter function.

* * * * *